Figure 2:
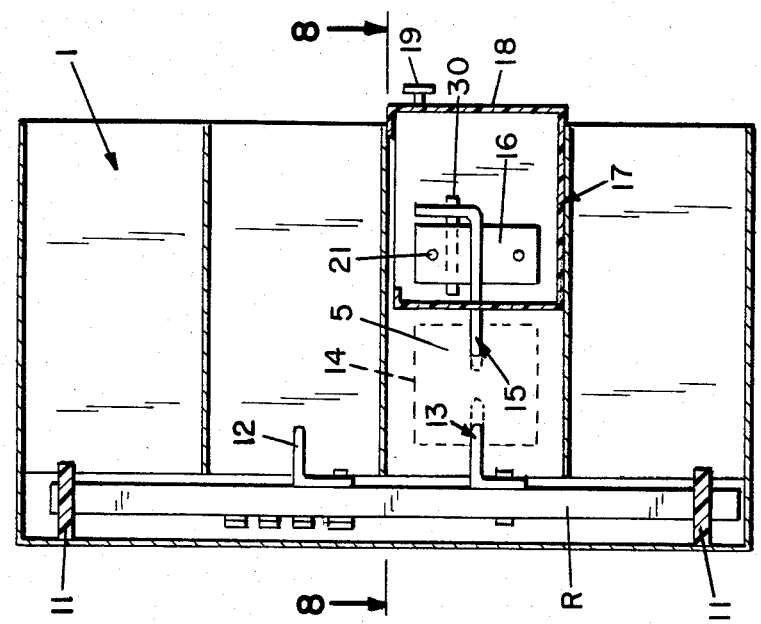

United States Patent [19]

Loegstrup et al.

[11] Patent Number: 4,534,612
[45] Date of Patent: Aug. 13, 1985

[54] CURRENT CONNECTING DEVICE FOR THE ESTABLISHING OF ELECTRICAL CONNECTION BETWEEN CONDUCTORS

[75] Inventors: Joergen Loegstrup, Snekkersten; Preben C. Sparre, Espergaerde, both of Denmark

[73] Assignee: A/S Loegstrup-Steel, Snekkersten, Denmark

[21] Appl. No.: 520,722

[22] Filed: Aug. 5, 1983

[30] Foreign Application Priority Data

Aug. 18, 1982 [DK] Denmark .............................. 3692/82

[51] Int. Cl.³ ............................................. H01R 13/16
[52] U.S. Cl. ................................................. 339/255 P
[58] Field of Search .................. 339/255 R, 255 P, 64

[56] References Cited

U.S. PATENT DOCUMENTS

| | | | |
|---|---|---|---|
| 4,230,388 | 10/1980 | Thierry et al. | 339/255 R |
| 4,445,732 | 5/1984 | Wafer | 339/255 P |
| 4,453,792 | 6/1984 | Bright et al. | 339/255 R |

FOREIGN PATENT DOCUMENTS

| | | |
|---|---|---|
| 1095915 | 12/1960 | Fed. Rep. of Germany . |
| 1212612 | 3/1966 | Fed. Rep. of Germany . |
| 168769 | 10/1959 | Sweden . |

Primary Examiner—Joseph H. McGlynn
Attorney, Agent, or Firm—Merchant, Gould, Smith, Edell, Welter & Schmidt

[57] ABSTRACT

A current connecting device for establishing electrical connection between rail conductors, having contact clips (20) and division plates (23), the contact clips (20) being modular and comprising two flat electrically conducting coupling pieces (35, 50) which are disposed inside a housing (26) made of insulating material with openings (49) for connection. Each of the coupling pieces has a spring (33, 34) which provide the necessary contact pressure. Each contact clip (20) has an insulating housing (26) in which there is disposed a fixed coupling piece (50) and a coupling piece (35) which can be made maneuverable if desired. Each coupling piece has two contact surface (36, 37, 38, 39). Both the division plates (23) and the contact clips (20) are provided with a releasing element (27, 28). The device is a universally applicable current connector with which one can form conductive couplings between electrical conductors, for example copper rails (40), wherever it is desirable. A number of contact clips can be coupled together, all of which can be maneuvered by a common maneuvering element (55) if so desired.

8 Claims, 11 Drawing Figures

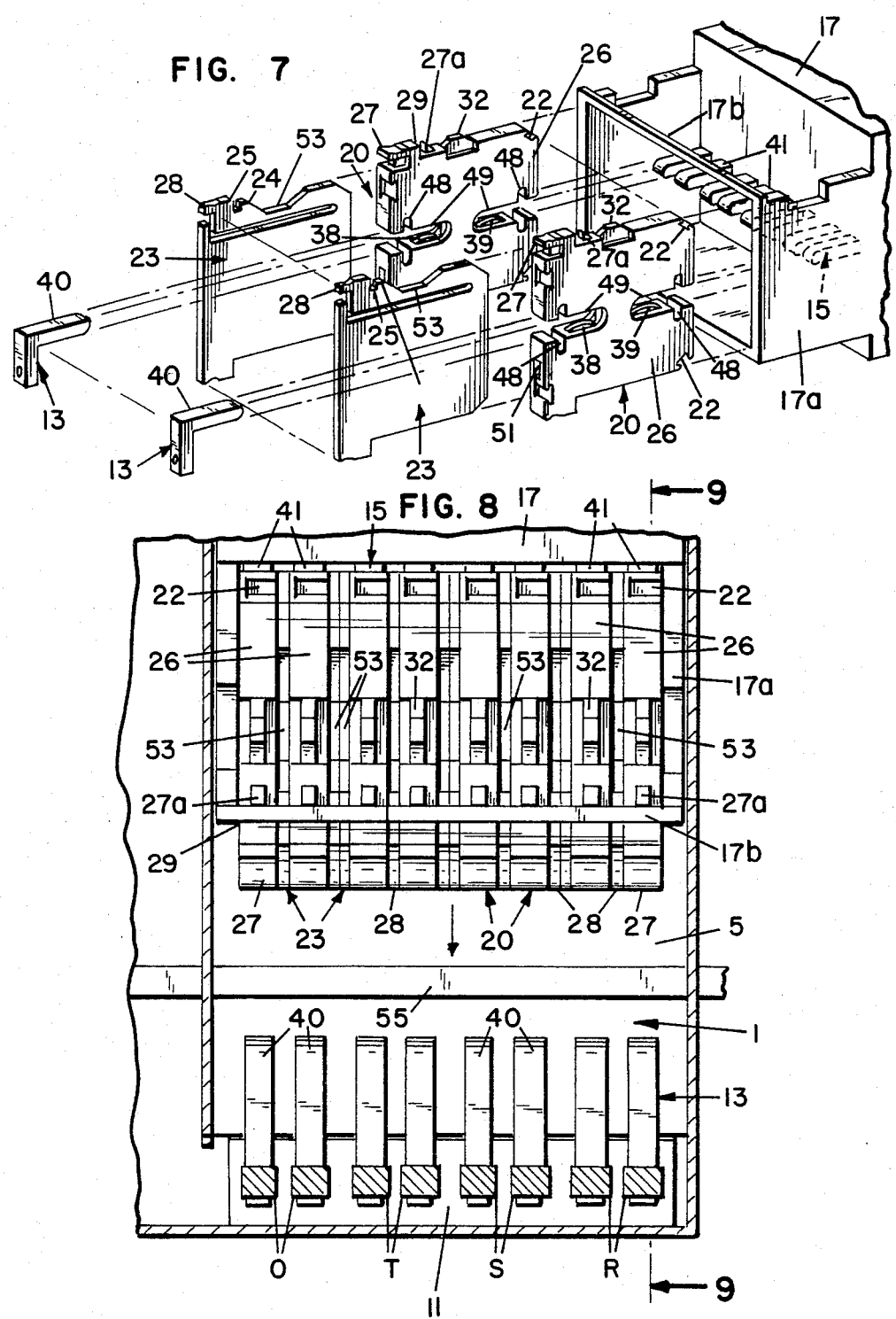

CURRENT CONNECTING DEVICE FOR THE ESTABLISHING OF ELECTRICAL CONNECTION BETWEEN CONDUCTORS

The invention relates to a current connecting device for establishing electrical connection between conductors, for example conductors formed as rails or rail-like conductors.

The invention is intended particularly, but not exclusively, for use in metal-enclosed electrical coupling systems.

Metal-enclosed electrical coupling systems are at present used to a great extent, especially made up in modular form with, for example, module dimensions of 190 mm, but other module dimensions can also be used. Inside the metal-enclosed systems, well protected against dirt, moisture, touching etc., are placed the electrical conductor rails and mounting plates on which the many different electrical components are mounted, for example transformers, measuring equipment, switches, relays, fuses etc.

The mounting plates are secured to the enclosure's various edge rails and brackets, for example on shelves or such that they comprise shelves. The system is also provided with different forms of lids and cover plates for the shielding and covering of the components mounted inside the enclosure. On the covers can be mounted electrical components such as switches, contact breakers, measuring instruments and signal lamps etc. The sizes and contents of metal-enclosed systems are normally dimensioned specifically for the individual function, all depending on the nature of the function.

For certain applications, the mounting plate is formed as a kind of drawer which can be pulled out of the metal-enclosed structure, for example during assembly or repair, which can thus be carried out in a more convenient working position. By forming the mounting plate as a drawer, it is also possible to rectify failures or similar defects quickly, in that the whole of the drawer is exchanged for a drawer without defects.

For the coupling of electric current to the withdrawable mounting plate, a releasable contact arrangement has to be used. From Swedish Pat. No. 168,796 is known a contact arrangement consisting of contact pieces influenced by springs, making it possible, for example, to couple two rails electrically together. By disposing several contact arrangements side by side, the possibility is provided of transferring a suitably high current, but at the same time it thus becomes difficult to insert and withdraw the rails and the contact arrangement. To remedy this, the contact arrangement has been made releasable, as is disclosed in German publication No. 1,095,915, in such a manner that the arrangement has a decoupled position and a coupled position, in that a manoeuvring member is connected to the coupling pieces and is led along a curved face, for example an inclined face, so that automatic coupling is achieved. It is difficult, however, to separate a contact arrangement coupled together in this manner, the reason being that the contact pressure must be of a certain amount in order to be effective, and this contact pressure cannot immediately be relieved before the coupling parts are moved a distance away from each other.

A current connecting arrangement is also known from German publication No. 1,212,612, said arrangement comprising flat, electrically conducting coupling pieces in the form of a coupling piece with two contact surfaces and two oppositely disposed coupling pieces each with a contact surface. The contact surfaces are toothed and the current connecting arrangement is moreover arranged for ordinary leads. Furthermore, the coupling pieces are partly surrounded by a housing of insulating material, so that when two such arrangements are disposed against each other, the coupling pieces of at least the one of them are completely surrounded by insulating material close to the openings through which the leads are inserted.

The object of the present invention is to provide a module-built current connecting system which consists of identical, independently insulated contact clips which can be disposed right up against each other, so that one is able, possibly while using intermediate plates of electrically insulating material, to build up any desired combination of coupling of current of low or high current intensities.

This object is achieved by forming the current connecting device.

Depending upon the intensity of the current to be transferred, one uses the necessary number of current connecting devices, in that these are held together by a suitable holder. The springs provided in the insulating housing give the coupling pieces suitable contact pressure, thus when several connecting devices are coupled in parallel, one obtains several contact surfaces, each with great contact pressure.

After the coupling together, if necessary it is possible to increase the contact pressure as desired. Thus one has a certain contact pressure during the coupling together, so that the friction is not too great. This is an advantage particularly when many contact clips are mounted side by side. Similarly, it is possible to relieve the most essential part of the contact pressure before separation of a coupled current connecting device. Moreover, due to the insulating housing, in many cases one can carry out work, for example repairs, while power is connected to the installation.

All of the movable coupling pieces in an assembly can be manoeuvred with one common manoeuvring member, also even though they connect current to different circuits and components.

One can carry out electrical connection to a rail to the one side, that is in the one opening in the insulating housing, hereby achieving a construction which makes the forming of a female plug possible.

The current connecting device can also be formed according to an alternate embodiment whereby one obtains an additional current take-off which, for example, can be disposed on the same side as that on which the current connection is made.

With an insulating housing one can thus carry out permanent assembly at places where a separation must not occur. One can also use such a current connecting device for the forming of an electrical male plug.

In the preferred embodiment, the current connecting device is formed with the possibility of inserting one or more division plates between or at the side of the contact clips. It is thus necessary for the rail which is to be placed in the current connecting device to have a corresponding recess in order for it to come into the opening between the contact pieces. This can also find application if the current connecting device is used as an edge connection for printed circuit boards for heavy current, in which case one can code the edge of the printed circuit by means of notches, corresponding to where division plates are inserted between or at the side of the contact clips.

The contact clips and the division plates must naturally be inserted and secured in some form of holder. Preferably, this is carried out by providing the contact clips and the division plates with locking arrangements, which in addition can be provided with a releasing element. One can thus insert and remove contact clips and division plates as desired in a suitable securing element.

Figure 1:
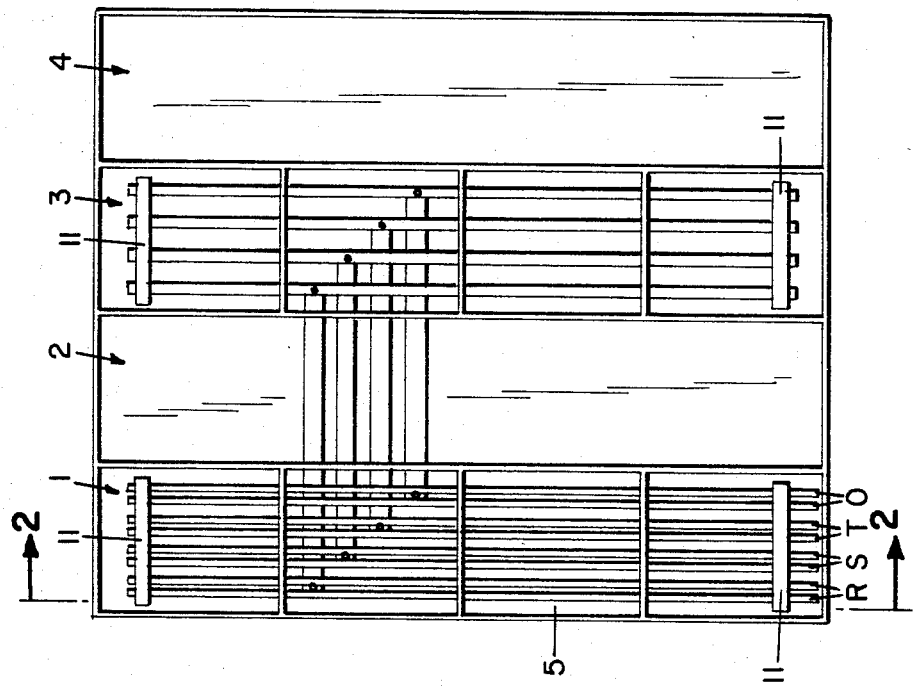
Figure 3:
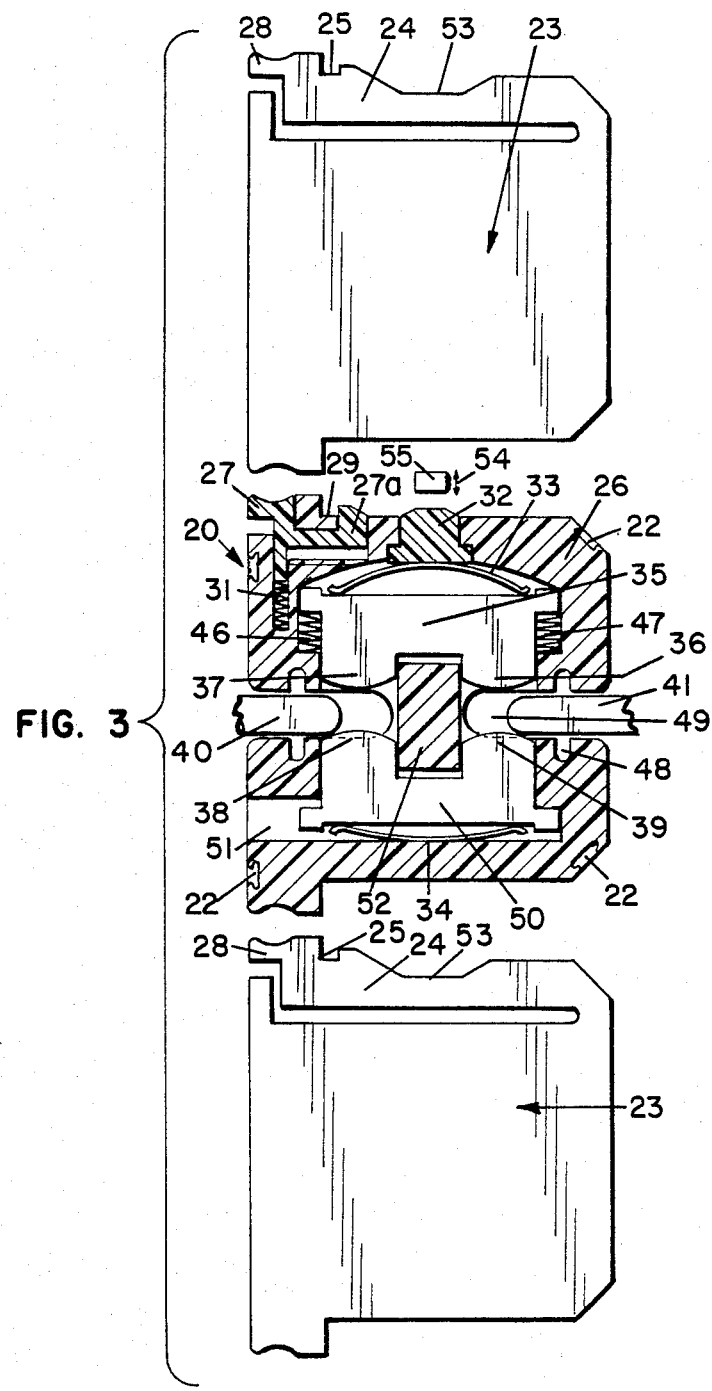
Figure 4:
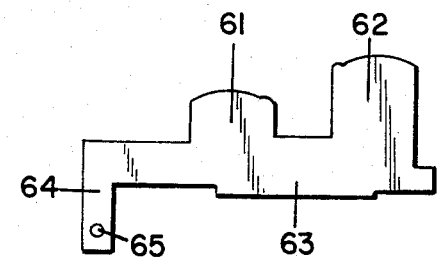
Figure 5:
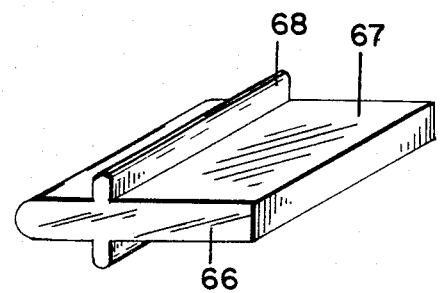
Figure 6:
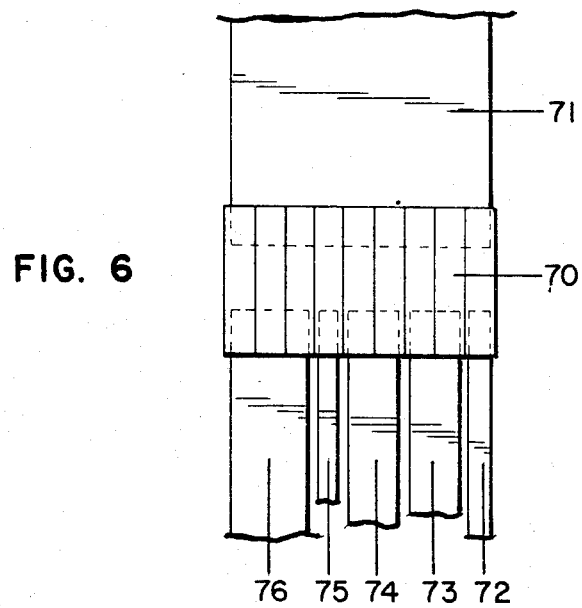
Figures 9, 10, 11:
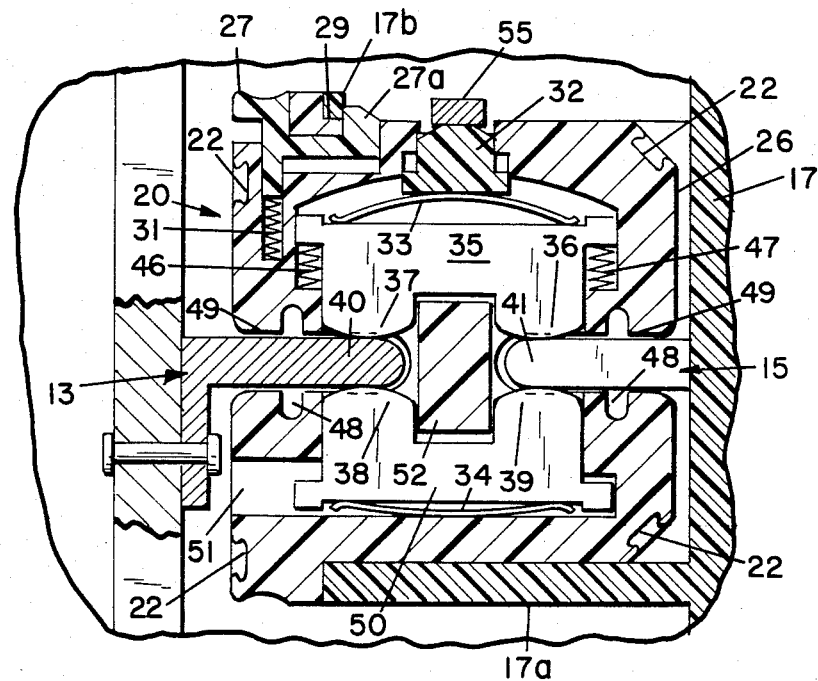

The invention will now be described with reference to the accompanying drawing which shows an example of a preferred embodiment, and where FIG. 1 is a schematic view showing a metal-enclosed installation with rail areas seen from the front, without covers, frontplates or mounting plates, FIG. 2 is a schematic view showing FIG. 1 seen in the direction 2—2 in FIG. 1, and also showing schematically one drawer inserted, FIG. 3 shows the current connecting device according to the invention seen in section, and two division plates which are displaced in relation hereto in the vertical direction, FIG. 4 shows a variant of a contact piece according to the invention, FIG. 5 shows a copper rail with locking ribs for special applications according to the invention, FIG. 6 shows an example of an assembly of several contact clips, electrically insulated from one another, which lead current to various circuits, FIG. 7 shows an exploded perspective view of a drawer, current connecting devices, and division plates prior to assembly, portions thereof being broken away, FIG. 8 is a horizontal sectional view seen in the direction of 8—8 of FIG. 2 showing a drawer partially inserted in an enclosure, FIG. 9 shows a fragmentary sectional view seen in the direction of 9—9 of FIG. 8, FIG. 10 is a sectional view generally similar to FIG. 9 but showing the modified contact piece of FIG. 4 in place, and FIG. 11 is a perspective view showing the copper rail of FIG. 5 in engagement with a current connecting device.

Shown schematically in FIG. 1 is a metal-enclosed installation seen from the front and comprising four vertical parts 1, 2, 3, 4. In part 1 is shown the incoming conductor rails as four double copper rails R, S, T, 0. In the installation, preferably rearmost, where the four double conductor rails are also disposed, there is provided a rail area which leads current to part 3, for example at the normal mains voltage of 380 volts. This is shown merely as an example, in that it is obvious that the rail area must lead to all those parts of the installation which are being utilized and where electrical energy is to be used, and it is similarly only by way of example that in part 3 there are shown single rails for each phase. The area marked 5 in part 1 can be such a part where a mounting plate with components can be placed.

FIG. 2 shows the installation in FIG. 1 seen from the side in the direction 2—2 in FIG. 1. One can see only the phase rail R, which with insulating brackets 11 is secured to the rear wall of the installation. On the double rail R there is shown bolted, by way of example, a current take-off 13, which via a coupling point 14 shown only by the stippled lines in FIG. 2 leads electric current to a contact leg 15 in a housing 16. Above the current take-off 13, a further current take-off 12 is shown by way of example on the same phase rail. The contact leg 15 is secured to the housing 16 by means of a bolt 30. Also shown schematically is a drawer 17 with frontplate 18 on which there can be mounted a handle, a switch or the like 19. FIG. 2 must be considered only as a schematic sketch and thus does not show the individual parts in their correct mutual proportions. It merely shows the principle of disposing components on a shelf or drawer in a metal-enclosed installation.

The coupling part 14 shown by the stippled lines in FIG. 2 can, for example, be a current connecting device according to the invention. Although the invention is described hereafter partly together with an application, for example as shown in FIG. 2, it will be obvious to those familiar with the art that many other possibilities of application can be envisaged, for example the already discussed possibility of edge connection for printed circuits for heavy current, or applications of the kind explained in connection with FIG. 6.

Seen from the side in FIG. 3 is a contact clip 20 and two division plates 23, said plates being displaced one above and one below the contact clip.

A contact clip 20 consists of two coupling pieces, i.e. a fixed coupling piece 50 and a movable coupling piece 35. Under the fixed coupling piece 50 is provided a spring 34 which creates the necessary contact pressure and distributes it equally to both contact surfaces 38 and 39. The movable coupling piece 35 also has a spring 33 which similarly creates the necessary contact pressure and distributes it equally to both contact surfaces 36 and 37. Here, the coupling pieces are shown as solid copper/brass and are both 3 mm thick. For smaller current intensities, copper/brass, for example moulded into plastic, can be used.

The coupling pieces 35 and 50 are embedded in an insulating housing 26, so that the housing consists of two thin plates of approx. one mm which surround the copper parts and which around along the edge are filled out with insulating material. In order to control the movable coupling piece 35, a rectangular guide block 52 of insulating material is formed approximately in the middle of the housing.

The movable coupling piece 35 is held substantially free of the openings 49 for the conductors by two small helical springs 46 and 47.

When the necessary number of contact clips 20 and division plates 23 have been placed in position, the electrical coupling is effected by moving a maneuvering element 55 downwards in the direction of arrow 54. The maneuvering element 55 influences a coupling stud 32 of insulating material, which in turn influences the spring 33. The springs 33 and 34 are of strong spring steel and can transfer quite large forces without bending to any considerable degree. The coupling piece 35 is therefore moved downwards into contact with the copper rails portions 40 and 41, of current take-off 13 and contact leg 15 respectively thus forming an electrical connection between the rails 40 and 41.

The maneuvering element 55 is common to all contact clips 20 and, in the event of division plates 23 being used, is not influenced by such plates, in that the plates have a recess 53 which leaves the maneuvering element 55 free of all the division plates. The maneuvering element can be formed in many different ways. In the drawing, the maneuvering element is shown as a stiff beam which extends over all the contact clips. The maneuvering element 55 is, however, necessary only in the embodiment of the invention shown here. In many other cases the maneuvering element can be omitted, in that the coupling stud 32 can be secured a suitable distance downwards, all depending on how great a contact pressure there is need for, i.e. depending on the intensity of the current to be transferred. In this situation, which will be described later in connection with FIG. 6, the contact clip is used simply as a kind of female plug at both ends. This form of application is also essential if one wants to use a row of contact clips as the edge-connecting element for printed circuits for heavy current, in that the row of contact clips function as the edge-connection element for the printed circuit. Two or more coupling pieces side by side and insulated from each other can thus be used to lead current to each its side of the printboard, because each set of coupling pieces in a housing, for reasons of the housing's insulating material, are insulated electrically from the adjacently disposed coupling pieces.

For certain applications, one can thus produce the insulating housing 26 completely without the coupling stud 32, so that the upper coupling piece 35 is disposed in the same way as the lower and fixed coupling piece 50.

Each of the contact clips can be provided with a locking recess 29 which is limited to the one side of an edge 27a, which is part of a lock release 27 which is held in the locking position by a spring 31. When the lock release 27 is depressed, the locking edge 27a moves downwards and the contact clip 20 can be released. Correspondingly, each division plate has a locking part 24 with a locking recess or groove 25. When a lock release 27 is depressed, the division plate is freed from a possible locking edge which extends down into the locking groove 25.

It is obvious that the contact clips 20 and the division plates 23 must sit firmly in a holder 17a designed for this purpose. This holder can have an edge 17b which corresponds to the above-mentioned locking grooves.

For certain applications, the fixed coupling piece 50 can be replaced by the coupling piece 63 which is shown in FIGS. 4, 10 or by another coupling piece. This coupling piece has a normal contact surface 61 and a raised contact surface 62 which, during the coupling, abuts against and forms an electrical connection with the contact surface 36 in FIG. 3. The connection part 64 can be provided with a hole or bore 65 for the fastening of, for example, a terminal. The coupling piece shown in FIGS. 4, 10 is used in those cases where current is to be taken off from the same side as the coupling is made, and when a rail does not have to be inserted in the opposite side. In the insulating housing 26 in FIG. 10, there is an opening 51 which is intended particularly for the connection part 64. It will be obvious that for certain applications it can be advantageous to exchange the two contact surfaces 61 and 62 in FIGS. 4, 10 so that the raised contact piece is disposed on the same side as the connection part 64, and there can also be cases where the connection part 64 is used on contact pieces without the raised part, but with equal parts such as 38, 39, for example when it is desired to produce a junction in which three conductors can be joined.

For certain applications it is desirable to ensure that the contact clip cannot be removed directly from the copper rail or, conversely, that one cannot take the copper rail off the contact clip. Here, the copper rail can be formed as shown in FIGS. 5, 11 which shows a copper rail 66 with an ordinary flat side 67 on which there is disposed or formed locking rib 68. These locking ribs fit into locking grooves 48 in the contact clip 20's housing, see FIG. 11 particularly. One can thus only assemble and separate a copper rail of the type shown in FIG. 5 and the contact clip by displacing these two parts transversely in relation to each other. If, after the assembly, division plates are inserted on each side of the contact clip or the contact clips, the connection can be separated only after the division plate has been withdrawn from at least the one side.

In FIG. 3 are also shown areas 22 in which marking elements can be placed, for example with colour codes or provided with cable numbering.

In FIG. 6 is shown another example of the application of the invention. Here, a row of nine contact clips 70 are shown side by side, all of them coupled to one conductor rail 71 which, for example, can be a phase rail. By means of the contact clips 70, current is taken off for a number of different components or circuits. The first three contact clips from the left side of the drawing are coupled to a rail 76, the next is coupled singly to rail 75, after which two contact clips are coupled to 74, two are coupled to 73 and a single contact clip is coupled to 72. It can thus be seen how the contact clips according to the invention can be arranged together to form a kind of multiplug for heavy currents.

One can also use one or more contact clips as a regular line separator in a coupling installation, which would correspond to the conductor 71 in FIG. 6 being divided into several conductors.

The insulating housing 26, the coupling stud 32 and the division plate 23 are made of insulating material, preferably a material such as Arylef U 100 or a corresponding material.

Coupling installations are often built up in modules of six mm, i.e. of copper rails which are rectangular and having a thickness of six or twelve mm and with a breadth in steps of six mm. Preferably, the contact clip 20 has a total thickness of six mm, i.e. the insulating housing 26 has an outside dimension of six mm. There is thus approx. three mm for the thickness of the copper coupling pieces, and approx. one mm of insulating material on each side thereof.

Preferably, the division plate has a thickness of three mm, so that an even number of division plates gives a multiple of six mm.

All the parts of insulating material are preferably form moulded. The insulating housing 26, for example, is form moulded in two parts which are assembled by means of tongue-and-groove joints, possibly together with the use of glue or solvent. In the above, the invention has been described mainly in connection with an extensible shelf or drawer in a metal-enclosed installation, or as a printed circuit for heavy current. It will be obvious to those familiar with the art that a current connecting device in accordance with the invention can be used in all electrical coupling installations at all places where two or more conductors have to be connected, whether or not this is for heavy current intensities for power distribution or small and lower current intensities, for example for control purposes, coupling purposes or for different electronic circuits which, for example, can be disposed on a printed circuit for heavy current applications.

We claim:
1. A current connecting clip line of modular construction, for establishing electrical connection between rail-like conductors comprising, at least one contact clip having at least one electrically conducting coupling piece movably maintained within an insulating housing formed so as to completely enclose the at least one coupling piece, said housing including at least one slot for receiving a rail-like conductor and wherein said at least one coupling piece may contact said conductor when said conductor is received in said slot, a coupling stud having two ends and being located generally within said housing and being in operative contact with said at least one coupling piece at one end, and accessible from outside said housing at its other end, said stud being externally movable to adjust the position of said coupling piece relative said slot, so that biasing of said stud effectively insures proper contacting between said coupling piece and the rail-like members.

2. A clip line according to claim 1, wherein said coupling stud is preferably made of electrically insulating material and extends somewhat outside the insulating housing and a common maneuvering means on said clip line for simultaneously acting on a plurality of coupling means.

3. A clip line according to claim 1, wherein said slot includes locking grooves for securely retaining said rail-like member, and wherein said rail-like member includes corresponding tongues to be received by said grooves.

4. A clip line according to claim 1 including a releasable locking clip on said contact clip for maintaining said clip within said line.

5. A clip according to claim 1 including first biasing means interposed between said one end of said stud and said coupling piece for biasing said piece toward said slot and to provide resilience between said stud and piece when the rail-like member contacts said piece in said slot.

6. A clip according to claim 5 including a second biasing means situated to apply a force in a direction opposite of said first biasing means so that the equilibrium position of the stud is determined by the relative bias forces.

7. A clip line according to claim 1, wherein said at least one coupling piece includes first and second coupling pieces opposing each other across said slot and wherein said second piece includes a raised contact surface of such length that it makes direct contact with said first piece.

8. A clip line according to claim 7, wherein said second piece includes an extension out of said housing for attachment to an electrical wire.

* * * * *